United States Patent [19]
Suzuki et al.

[11] Patent Number: 5,862,421
[45] Date of Patent: Jan. 19, 1999

[54] LIGHT EMITTING ELEMENT

[75] Inventors: Takashi Suzuki, Hino; Yoji Watanabe, Fuchi, both of Japan

[73] Assignee: Olympus Optical Co., Ltd., Tokyo, Japan

[21] Appl. No.: 916,249

[22] Filed: Aug. 22, 1997

[30] Foreign Application Priority Data

Sep. 3, 1996 [JP] Japan .................................. 8-233073

[51] Int. Cl.⁶ .................................................. G03B 17/24
[52] U.S. Cl. .......................................................... 396/318
[58] Field of Search .................................... 396/318, 315, 396/317

[56] References Cited

U.S. PATENT DOCUMENTS 5,422,694  6/1995  Yoshida et al. ........................ 396/315

FOREIGN PATENT DOCUMENTS

5165090 A  6/1993  Japan .
6308596 A  11/1994  Japan .

Primary Examiner—W. B. Perkey
Attorney, Agent, or Firm—Kenyon &Kenyon

[57] ABSTRACT

An apparatus for imprinting data on a traveling film surface by utilizing a seven-segment light emitting element, comprises a film winding mechanism including a film feeding motor. A film feeding control device controls the film feeding mechanism to wind up one frame of the film after an exposure operation has finished. A pulse signal output device outputs pulse signals in accordance with the rotation of the motor. A perforation detecting portion detects a perforation and outputs a perforation signal. A PI counter counts the number of the pulse signals outputted between the detection of first and second perforation signals. A determining device determines light emitting intervals for the present imprinting operation based on the number of the pulse signals counted at the time of the preceding one-frame winding.

14 Claims, 6 Drawing Sheets

FIG. 5

| TIM | REGISTER FOR STORING DATA ON DATA IMPRINTING TIMING |
|---|---|
| LPI | REGISTER FOR STORING NUMBER OF MOTOR PI SIGNALS GENERATED BETWEEN DETECTION OF TWO SPECIFIC PERFORATIONS AT THE TIME OF PRECEDING ONE-FRAME WINDING |
| PI COUNTER | COUNTER FOR COUNTING NUMBER OF MOTOR PI SIGNALS |
| PERFORATION COUNTER | COUNTER FOR COUNTING NUMBER OF PERFORATIONS AT THE TIME OF ONE-FRAME WINDING |

PERFORATION

27

TRAVELING AMOUNT
OF ONE FRAME
(8 PERFORATIONS)

PERFORATION

27

INTERVAL FOR ONE CHARACTER

LIGHT EMITTING ELEMENT

BACKGROUND OF THE INVENTION

1. Field of the Invention

This invention relates to a data imprinting apparatus of a camera and more particularly to a data imprinting apparatus provided in a camera for imprinting data, such as a date, on a film loaded in the camera, when the film is being wound up.

2. Description of the Related Art

For example, Japanese Laid-Open Patent Application Publication No. 6-308596 discloses an apparatus for optically recording a date, time and the like. In this apparatus, pulse signals are generated in accordance with the rotation of a film feeding motor and an imprinting timing is determined based on the number of pulse signals generated per perforation immediately before the start of imprinting the data.

However, in such a conventional apparatus, the film must be fed by at least one perforation for determining the imprinting timing.

Therefore, depending on the positional relationship between the frame and perforations of the film, there may be a limit to that position and space in the frame in which desired data are imprinted. Namely, it may be impossible to imprint the data, for example, starting from a position which is near the end of the frame.

SUMMARY OF THE INVENTION

An object of the present invention is to provide a data imprinting apparatus which does not use a costly film encoder for determining the imprinting timing and increases flexibility in relation to the position and space where desired data are imprinted.

In order to solve the above problem and attain the above object, according to this invention, pulse signals (motor PI signals) are generated as a driving motor rotates. Based on the number of the pulse signals detected between two perforations of a preceding frame immediately before a following frame to be exposed, imprinting intervals for the following frame is determined to imprint desired data.

In detail, an apparatus for imprinting desired data on a traveling film comprises a light emitting element for emitting light at intervals to imprint the data, and a film feeding mechanism including a film feeding motor. A film feeding control means controls the film feeding mechanism to wind up one frame of the film after a predetermined exposure operation has finished. A motor pulse output means detects a rotation of the film feeding motor and outputs motor pulse signals corresponding to the detected rotation. A perforation detecting means detects a perforation in the film and outputs a perforation signal corresponding to the detected perforation. A counting means counts the number of the motor pulse signals after a specific perforation signal is produced and until the next perforation signal is produced. Based on the number of motor pulse signals counted by the counting means at the time of preceding one-frame winding, a determining means determines the intervals of light emission of the light emitting element for imprinting at the time of present one-frame winding.

BRIEF DESCRIPTION OF THE DRAWINGS

FIG. 5 is a table listing the functions of registers and counters used in the flowchart of FIG. 4.

DETAILED DESCRIPTION OF THE PREFERRED EMBODIMENTS

Figure 1:
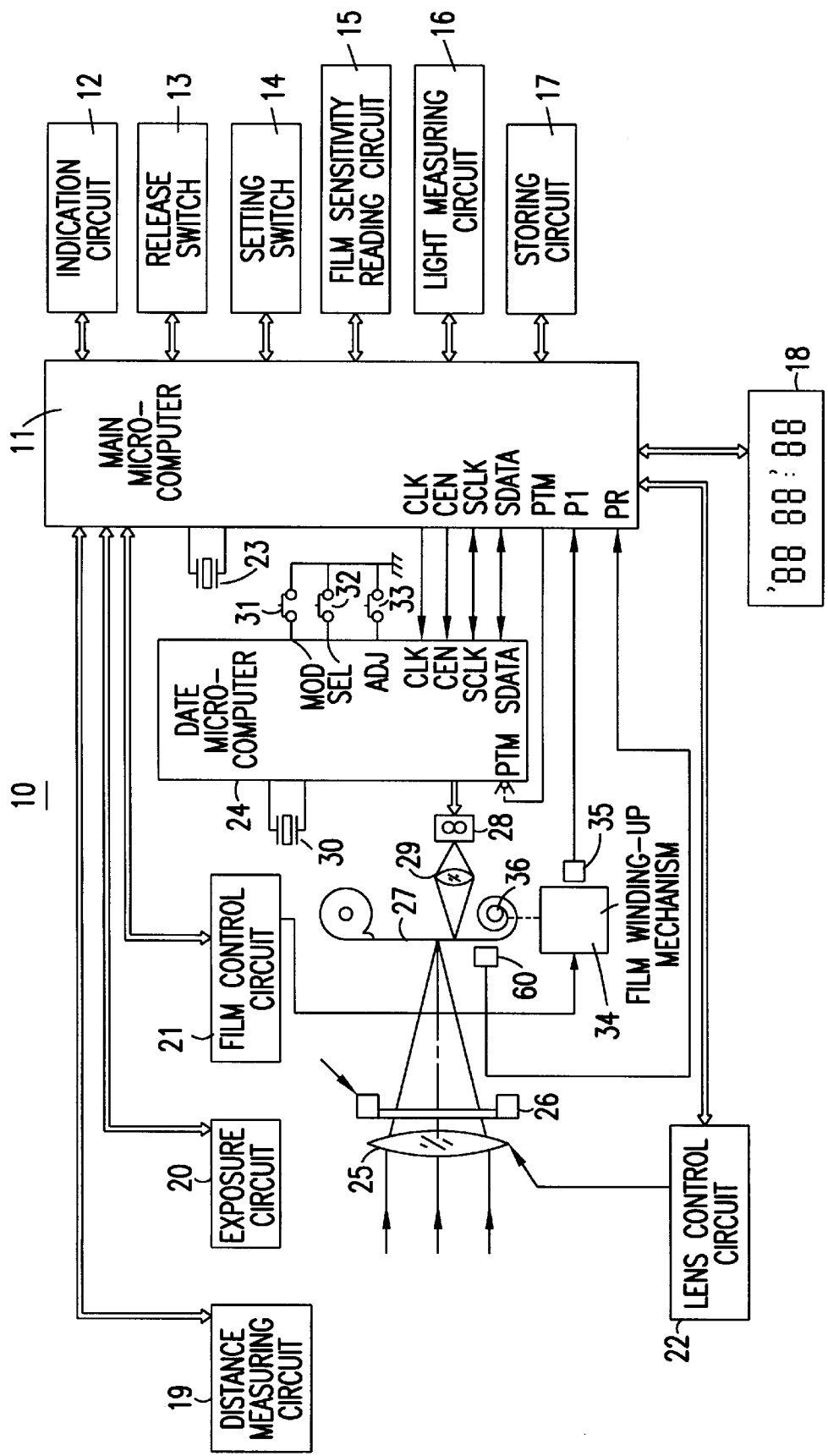
FIG. 1 is a block diagram of a camera including a data imprinting apparatus of a first embodiment of this invention.

FIG. 1 is a block diagram of a camera including a data imprinting apparatus of an embodiment of this invention. A main microcomputer 11 of the data imprinting apparatus is a control means for sequentially controlling the whole system of the camera and for making various calculating operations. The main microcomputer 11 is connected, via respective serial bus lines, to an indication circuit 12, a release switch 13, a setting switch 14, a film sensitivity reading circuit 15, a light measuring circuit 16, a storing circuit 17, a date indicating circuit 18, a distance measuring circuit 19, an exposure circuit 20, a film control circuit 21, and a lens control circuit 22. The main microcomputer 11 is also connected to an oscillator 23 and a date microcomputer 24 (D microcomputer). The oscillator 23 generates a clock signal for the main microcomputer 11.

The indication circuit 12 indicates an operation mode of the camera, exposure data, the number of exposed frames, and the like. The release switch 13 is a two-stroke switch having a first release switch and a second release switch. When the first release switch is turned on by being pushed halfway, a distance measuring operation is started. When the second release switch is turned on by being pushed fully, an exposure operation is started. The setting switch 14 is a switch for setting an operation mode of the camera.

The film sensitivity reading circuit 15 is a circuit for reading a DX code given to a surface of a film cartridge loaded in the camera, and for transmitting an SV value signal which indicates a film speed to the main microcomputer 11. The storing circuit 17 is a non-volatile memory for storing data necessary to be stored even when the power is turned off, such as the number of frames of the film 27 and an operation mode of the camera. The date indicating circuit 18 is a circuit for indicating date data on the basis of data from the date microcomputer 24.

The distance measuring circuit 19 is a circuit for providing distance measurement data of an object to be photographed to the main microcomputer 11. Based on a control signal of the main microcomputer 11, the exposure circuit 20 controls a lens shutter 26 functioning as an aperture as well as a shutter so that the amount of light from a photographic lens 25 can be adjusted for a proper exposure operation.

Based on a control signal of the main microcomputer 11, the film control circuit 21 controls the driving of a film winding-up mechanism 34 to perform automatic winding of the film 27, and the like. A film winding-up operation detecting portion 35 provides to the main microcomputer 11 pulse signals produced in accordance with the rotation of a film feeding motor 38 (see FIG. 2) included in the film winding-up mechanism 34. Details are described below.

Based on the pulse signals, the main microcomputer 11 automatically winds up the film 27 and transmits PTM signals representing date imprinting timing to the date microcomputer 24. A perforation detecting portion 60 detects a perforation provided in the film 27 and inputs a detection signal to the main microcomputer 11.

Based on a control signal of the main microcomputer 11, the lens control circuit 22 drives the photographing lens 25 to form an object image on the film 27. The date microcomputer 24 is a microcomputer specially designed to imprint the date data on the film 27. Based on a control signal of the main microcomputer 11, the date microcomputer 24 uses a seven-segment light emitting diode 28 and an imprinting lens 29 to imprint the date data at a predetermined position of the film 27. The seven-segment light emitting diode 28 has seven light emitting segments arranged to form a letter "8" on a package. The seven light emitting segments are selectively combined to emit light so that a variety of characters and symbols can be represented. The seven-segment light emitting diode 28 and the imprinting lens 29 are positioned in the vicinity of the film winding-up mechanism 34 so that imprinting can be started from the front end of each frame of the film 27. The imprinting operation is in synchronism with the PTM signals, which are imprinting timing signals from the main microcomputer 11.

An oscillator 30 continuously generates a clock signal for the date microcomputer 24. The date microcomputer 24 counts the clock in order to prepare imprinted data such as "year," "month," "day," "hour," and "minutes."

Switches 31 to 33 are a mode (MOD) switch, a selector (SEL) switch, and an adjust (ADJ) switch, respectively. The photographer operates these three switches to select a desired imprinting mode and correct the imprinted data. The selected mode and the corrected data are indicated on the date indicating circuit 18. Thus, the photographer operates the three switches 31 to 33 while checking the indication.

A signal is transmitted and received between the main microcomputer 11 and the date microcomputer 24 via a bus line for transmitting signals CLK, CEN, SCLK, and SDATA.

Figure 2:
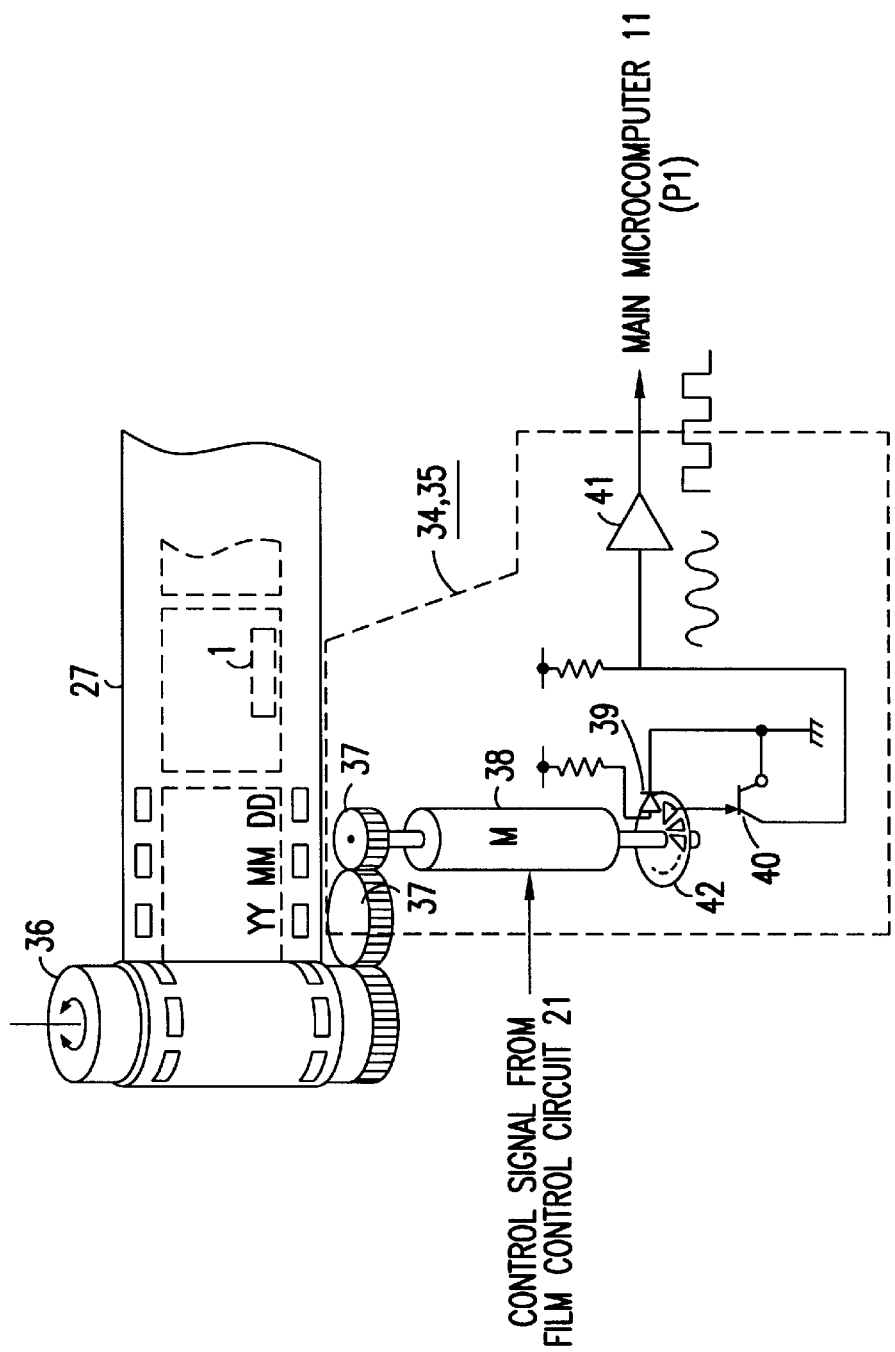
FIG. 2 is a perspective view of a film winding-up mechanism and a film winding-up operation detecting portion of the data imprinting apparatus of FIG. 1.

FIG. 2 shows a structure of the film winding-up mechanism 34 and the film winding-up operation detection portion 35 (see the portion surrounded by the broken line) which is a main structure of the data imprinting apparatus.

A film take-up spool 36 is coupled to a driving shaft of the feeding motor 38 via a meshing gear train 37 and is rotated to wind up the film 27. The drive of the feeding motor 38 is controlled by the film control circuit 21.

The driving shaft of the feeding motor 38 is provided at a position opposite to the gear train 37 with a PI blade 42 having openings arranged at regular intervals in the circumferential direction of the PI blade 42. An infrared light emitting diode 39 is provided above the PI blade 42. A phototransistor 40 is arranged opposite the infrared light emitting diode 39 across the PI blade 42. The infrared light emitting diode 39 and the phototransistor 40 form a photo-interrupter (PI) for detecting the presence or absence of the openings of the PI blade 42, as a rotation signal of the motor.

When the film control circuit 21 transmits a driving signal to the film feeding motor 38, the feeding motor 38 rotates its driving shaft to rotate the take-up spool 36 via the gear train 37 so as to wind up the film 27. At the same time, the PI blade 42 is also rotated. The rotation of the PI blade 42 causes the infrared light generated by the infrared light emitting diode 39 to either be transmitted to the phototransistor 40 or blocked, whereby the phototransistor 40 turns on and off. The on/off waveform is transmitted to a waveform shaping circuit 41.

The waveform shaping circuit 41 shapes the inputted on/off waveform into a rectangular waveform, which is transmitted to the main microcomputer 11 as pulse signals (namely motor PI signals) corresponding to the movement of the take-up spool 36. The number of the motor PI signals is counted by a PI counter (not shown) inside the main microcomputer 11. The PI counter is an independent counter which counts independently of programmed operations when the main microcomputer 11 allows it to count.

Figure 3A:
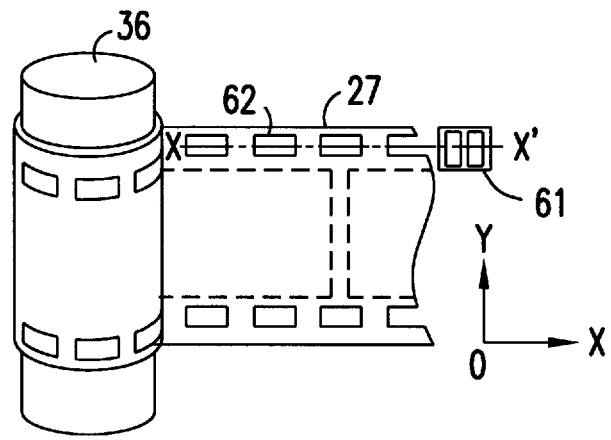
FIG. 3(a) is a perspective view showing a positional relationship between a film and a photoreflector which is a perforation detecting sensor.
Figure 3B:
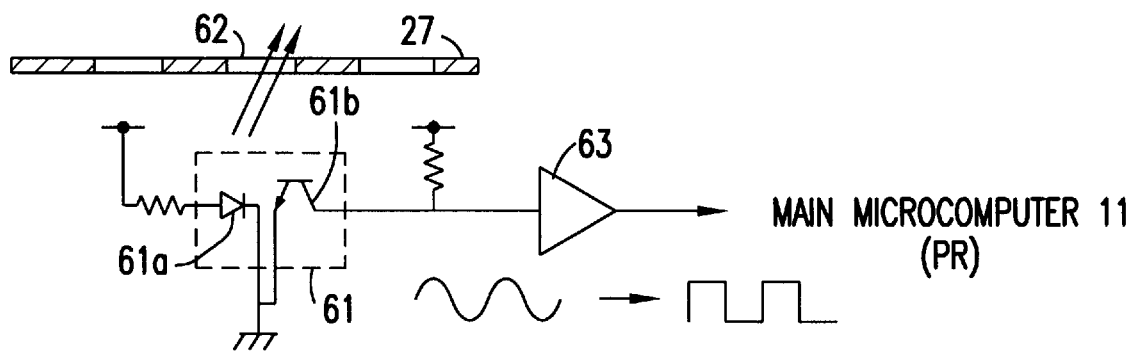
FIG. 3(b) is a cross-sectional view of the film taken along dash-dotted line X-X' in FIG. 3(a) with a detailed circuit diagram of a perforation detecting portion.

FIGS. 3(a) and 3(b) show a detailed structure of the perforation detecting portion 60. FIG. 3(a) shows the positional relationship of a film 27 and a photoreflector (PR) 61 which is a sensor for detecting a perforation 62. The detecting portion of the photoreflector 61 is arranged at a position shown in FIG. 3(a), where it faces the perforation row which is on one side edge of the film, so that the detecting portion can detect the perforation 62 of the film 27 being fed in the X-axis direction.

FIG. 3 (b) shows a cross-sectional view of the film 27 taken along dash-dotted line X-X' in FIG. 3(a) and a detailed circuit diagram of the perforation detecting portion 60 shown in FIG. 1. In the cross-sectional view, perforations 62 through which light passes are shown as window portions which are not hatched. Infrared light emitted by an infrared light emitting diode 61a toward the film 27 passes through the window portion.

The photoreflector 61 comprises the infrared light emitting diode 61a and a phototransistor 61b. When the infrared light is reflected by the hatched portion of the film 27, the phototransistor 61b receives the reflected light, thereby being turned on. On the other hand, if the perforation 62 of the film 27 exists at a positioned toward which the infrared light is emitted, the infrared light is not reflected, so that the phototransistor 61b is turned off. The waveform of the on/off signal (perforation signal) of the phototransistor 61b corresponding to the feeding operation of the film 27 is shaped as shown in FIG. 3(b) by a waveform shaping circuit 63 at the subsequent stage. The shaped on/off signal is transmitted to the main microcomputer 11.

In the data imprinting apparatus of this invention as described above, while one frame of the film 27 is being wound up after the exposure operation has been finished, the seven-segment light emitting diode 28 repeatedly emits light in synchronism with the motor PI signals to record in legible form a plurality of characters or symbols, such as day-month-year data, on the film 27. However, the frequency of the motor PI signals is too large for imprinting timing signals and thus must be divided. Further, as the last frame of the film 27 approaches, the number of the signals generated during one-frame winding decreases (because the outermost diameter of the successive convolutions of the film 27 on the take-up spool 36 becomes large, thereby increasing the feeding speed of the film 27). Therefore, a remedy for this phenomenon must be considered.

Accordingly, the data imprinting apparatus of this invention detects and stores how many times the feeding motor 38 has rotated for feeding a predetermined amount of the film 27 during the preceding film feeding operation. Based on the stored information, intervals for the present data imprinting operation are determined.

Specifically, the data imprinting apparatus counts the motor PI signals generated after a specific perforation is detected and until the next perforation is detected (that is, during one pitch) when one frame is wound up. The count number of the motor PI signals is stored. The light for the imprinting operation for the next frame is emitted when a number of the motor PI signals are generated, the number corresponding to the stored count number divided by a predetermined value.

In other words, the data imprinting apparatus detects and stores the moving speed of the preceding feed of the film 27. Based on the moving speed, the light emitting intervals for the present imprinting operation are adjusted. That is to say, a feature of this invention is that the intervals of the light emission timing signals for the present data imprinting are adjusted on the basis of the moving speed of the film 27 detected in the past (for example, immediately before the present data imprinting is started).

Figure 6A:
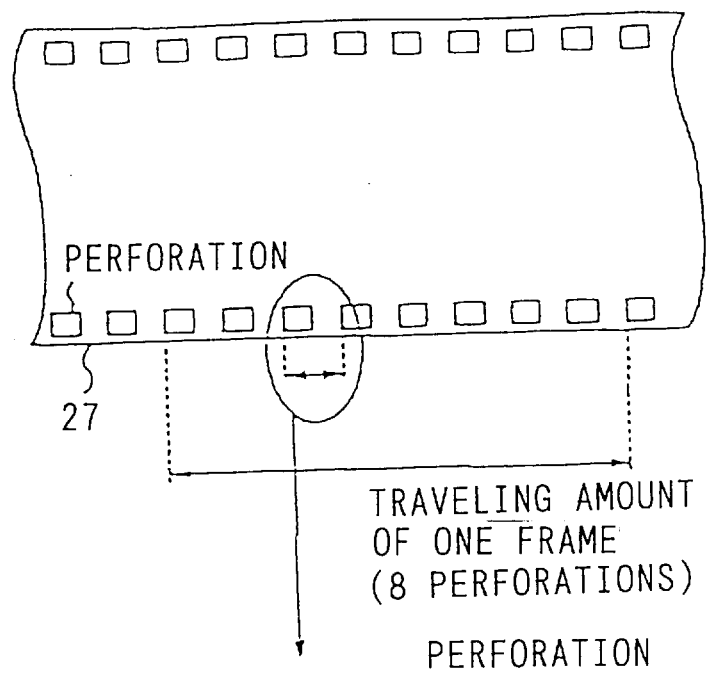
FIG. 6(a) is a partial view of a film showing the number of perforations for one frame.
Figure 6B:
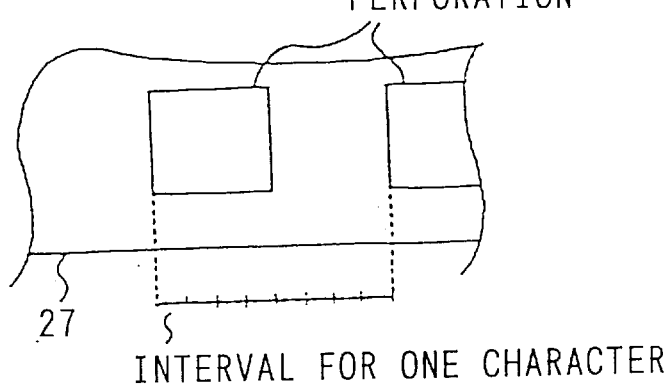
FIG. 6(b) is a partially enlarged view of the film showing an interval for imprinting a character on the film.

As shown in FIG. 6(a), the film 27 is fed by eight perforations per frame. FIG. 6(b) shows that the inteval for one imprinted character corresponds to one-eighth of one pitch between two perforations. The data imprinting apparatus imprints during one data imprinting operation eight characters per pitch between two adjacent perforations. Accordingly, the number of the motor PI signals generated between two adjacent perforations detected during the preceding one-frame winding is divided by eight. The calculated value represents the imprinting timing, that is, each character is imprinted when the number of the motor PI signals counted has reached the calculated value.

When the motor PI signals and the perforation signals are generated in accordance with the feeding of the film 27, the PI counter and a perforation counter, which are hard counters, execute counting operations independently of the sequence of operations of the main microcomputer 11. Therefore, when making a comparison as in step S6 below, the latest count value can be gained by only reading the value of the corresponding counter.

Figure 4:
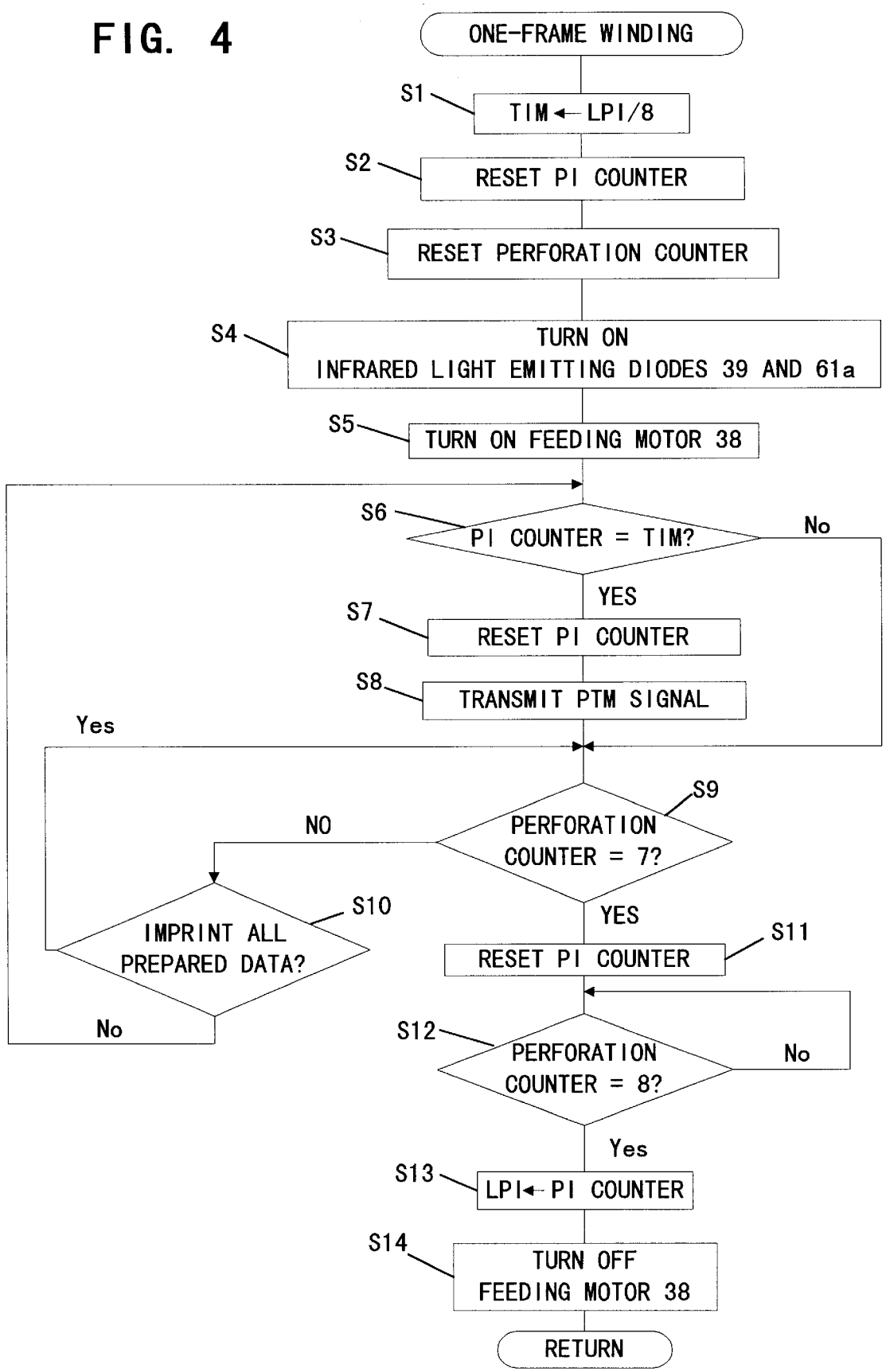
FIG. 4 is a flowchart of a subroutine "one-frame winding."

FIG. 4 is a flowchart of a subroutine "one-frame winding," which shows the operations during one-frame winding. FIG. 5 is a table listing the functions of registers and counters of the main microcomputer 11 used in the flowchart of FIG. 4. When the subroutine "one-frame winding" is called by a main routine of a camera sequence (not shown), processing operations proceed in the following sequence:

First, the value of a register LPI of the main microcomputer 11 is divided by 8, and the divided value is stored in a register TIM (step S1). The value of the register LPI is the number of the motor PI signals generated between two predetermined perforations adjacent to each other when the preceding frame is wound.

Next, the PI counter and the perforation counter are reset (namely, zeroed out) (steps S2 and S3). The infrared light emitting diodes 39 and 61a are turned on (step S4) so that the motor PI signal and the perforation signal are ready to be detected. Then, the feeding motor 38 is turned on to start the film feeding (step S5).

Subsequently, the value of the PI counter is compared with that of the TIM (step S6). If the values are not equal, the process proceeds to step S9. On the other hand, if the values are equal (that is, an imprinting point has been reached), the PI counter is reset (step S7). Then, the PTM signal (light emitting signal) is transmitted to the date microcomputer 24 (step S8).

The date microcomputer 24 receives the signal and lets the seven segmented light-emitting diode 28 emit light for a predetermined time.

Next, in step S9, it is decided whether the perforation counter has counted "7." If the counter has not counted "7," it is decided that the film feeding has not reached its final stage, and the step proceeds to step S10, in which it is decided whether all the prepared data have been imprinted. If the imprinting has been finished, the process returns to step S9. If it has not been finished, the process returns to step S6 again to repeat the operations of steps S6 to S8.

On the other hand, if it is determined in step S9 that the value of the perforation counter has reached "7," the process proceeds to step S11 to reset the PI counter. Subsequently, a standby loop is repeated until the perforation counter has counted "8" (step S12) When the perforation counter has counted "8," it means that one frame of the film has been fed (there are eight perforations for one frame). The content of the PI counter is then stored in the LPI (step S13). The feeding motor 38 is turned off (S14) and the process returns.

Thus, in this embodiment, the number of the motor PI signals generated until the perforation counter has counted from "7" to "8" is used as a count value for determining the next imprinting timing.

In this invention, the above counting operation is executed until a rear perforation, preferably the last, in the frame has been detected, mainly because the precision of timing control is enhanced when the detection is performed in a position which is near the next frame.

In the above embodiment, the motor PI signals generated between two adjacent perforations are counted. However, in order to further enhance the precision, the number of the perforations may be increased to three or more.

In this embodiment, the light emission timing of the present imprinting is determined based on the count value of the preceding film feeding operation. Therefore, there are no count data for the first frame. In order to solve this problem, a count operation as described above is executed at the last stage of an initial winding of the film 27 after the film 27 has been loaded. Further, at the first frame, the outermost diameter of the successive convolutions of the film 27 on the take-up spool 36 is almost the same as that of the take-up spool 36, and the film speed depends only on the diameter of the take-up spool 36. Accordingly, the count data may be initialized to a proper predetermined value.

A further variation is possible by providing a means (not shown) for measuring the actual moving time of the film from the number of perforations of the film detected within a predetermined time, or from the time spent for detecting a predetermined number of perforations, so that the present light emitting timing can be determined on the basis of the film moving speed at the time of the preceding one-frame winding. In this case, the motor PI signal is not necessary.

The rate for dividing the motor PI signals may be calculated by comparing the generating period of the motor PI signals with the generating period of the perforation signals.

The data imprinting apparatus according to this invention does not require an expensive film encoder apparatus for determining the imprinting timing. Further, the data imprinting apparatus has flexibility in relation to the position and space where the desired data are imprinted.

Many other variations may be possible within the spirit of this invention.

What is claimed is:

1. An apparatus for imprinting data on a film, the apparatus comprising:

a light emitting element for emitting light at intervals in order to imprint the data;

a film feeding mechanism including a film feeding motor;

film feeding control means for controlling the film feeding mechanism to wind up one frame of the film after a predetermined exposure operation has finished;

motor pulse output means for detecting a rotation of the film feeding motor and for outputting motor pulse signals corresponding to the detected rotation;

perforation detecting means for detecting a perforation in the film and for outputting a perforation signal corresponding to the detected perforation;

counting means for counting the number of motor pulse signals after a specific perforation signal is produced and until a following perforation signal is produced; and determining means for determining, based on the number of motor pulse signals counted by the counting means during a preceding one-frame winding, the intervals of light emission of the light emitting element for imprinting the data during a present one-frame winding.

2. The apparatus according to claim 1, wherein the preceding one-frame winding corresponds to a film winding during which the data were imprinted on an exposed frame of the film.

3. The apparatus according to claim 1, wherein the present one-frame winding corresponds to a present film winding during which the data are to be imprinted on an exposed frame of the film.

4. An apparatus for imprinting data on a film, the apparatus comprising:

a light emitting element for emitting light at intervals in order to imprint the data;

a film feeding mechanism including a film feeding motor;

film feeding control means for controlling the film feeding mechanism to wind up one frame of the film after a predetermined exposure operation has finished;

speed detecting means for detecting an approximate film moving speed as the film is fed; and determining means for determining, based on the film moving speed detected at the time of a preceding film feeding, the intervals of light emission of the light emitting element for imprinting the data during a present film feeding.

5. An apparatus for imprinting data on a film, the apparatus comprising:

a light emitting element for emitting light in order to imprint the data;

film feeding control means, including a film feeding motor, for rotating the film feeding motor to feed the film;

speed detecting means for detecting an approximate film moving speed as the film is fed; and signal output means for outputting light emission timing signals for the light emitting element in response to a rotation of the film feeding motor, wherein the signal output means further comprises an adjusting means for adjusting, based on a previously detected film moving speed, intervals of the light emitting timing signals for performing a present imprinting operation.

6. An apparatus for imprinting data on a film, the apparatus comprising: a a film feeding motor and a light emitting element, arranged to face the film, for emitting light when the film feeding motor winds up an exposed frame; and an arrangement for controlling the apparatus to determine intervals of data imprinting based on information on how much the film feeding motor rotated to feed a predetermined amount of the film during a preceding film winding.

7. An apparatus for imprinting data on a film, the apparatus comprising:

winding-up means for winding up the film and having a film feeding motor;

imprinting means arranged to face the film and having a light emitting element whose light emitting pattern is selectable; and control means for selecting the light emitting pattern of the light emitting element to imprint the desired data on the film as an exposed frame of the film is wound up by the winding-up means, wherein the control means determines time intervals for a newest data imprinting based on information on how the film feeding motor rotated to feed a predetermined amount of the film during a past film winding.

8. A data imprinting apparatus for optically recording data on a film, the apparatus comprising:

a film feeding mechanism;

a film feeding motor for driving the film feeding mechanism;

a rotation number detector arranged in the film feeding mechanism for detecting a number of rotations of the film feeding motor and outputting signals corresponding to the detected number;

a perforation detector for detecting movement of perforations as the film is fed and for generating outputs corresponding to the detected perforations, the perforations being provided in the film periodically;

a light emitting device arranged at a position where it faces the film being fed and having a plurality of light emitting portions arranged in a predetermined pattern, wherein light emitting patterns of the light emitting portions are controlled to imprint predetermined optical information on the film; and a control circuit for driving the feeding motor to feed the film, and for controlling light emitting intervals of the light emitting device for present imprinting based on the signals outputted from the rotation number detector while two consecutive outputs were generated by the perforation detector during a preceding film winding.

9. The apparatus according to claim 8, wherein the control circuit includes a non-volatile memory for storing the signals outputted from the rotation number detector while the two consecutive outputs are generated by the perforation detector at the time of the preceding film winding, and updates contents of the non-volatile memory each time a winding-up operation of the film is executed.

10. The apparatus according to claim 8, wherein the plurality of light emitting portions of the light emitting device comprises a plurality of segments arranged in a predetermined positional relationship.

11. A data imprinting apparatus for feeding a film having a perforation and for optically recording data on the film, the apparatus comprising:

a film feeding mechanism, including a motor, for feeding the film by a driving force of the motor and for outputting first and second pulse signals relating to the feeding operation;

a light emitting device arranged to face the film and having a plurality of light emitting patterns;

a selection circuit for selecting one of the light emitting patterns of the light emitting device in response to data to be imprinted; and a control circuit for controlling light emitting time intervals of the light emitting device for performing a present imprinting operation based on the first and second pulse signals generated during a preceding film winding.

12. The apparatus according to claim 11, wherein the first and second pulse signals comprise information on a rotation number of the motor and on a detection of a perforation of the film, respectively.

13. The apparatus according to claim 11, wherein the light emitting device comprises a plurality of light emitting portions arranged in a predetermined positional relationship.

14. An apparatus for imprinting data on a film in a camera, the apparatus comprising:

a light emitting element having a plurality of light emitting segments and capable of representing various characters and symbols by selecting a combination of the plurality of light emitting segments to emit light;

an imprinting optical system for imprinting on the film one of a character and a symbol represented by the light emitting element;

film feeding means for winding up one frame of the film after an exposure operation has finished; and control means for causing the light emitting element to emit light repeatedly during a film winding-up operation by the film feeding means to record a plurality of visually readable combination of at least one of characters and symbols in a frame of the film, wherein the control means comprises:

means for detecting a moving speed of the film as the film is wound up and for storing the detected moving speed; and means for determining light emitting intervals of the light emitting element for a present one-frame winding based on the film moving speed detected during a preceding one-frame winding.

* * * * *

UNITED STATES PATENT AND TRADEMARK OFFICE
CERTIFICATE OF CORRECTION

PATENT NO. : 5,862,421
DATED : January 19, 1999
INVENTOR(S) : Takashi SUZUKI, et al.

It is certified that error appears in the above-identified patent and that said Letters Patent is hereby corrected as shown below:

Column 1, line 54, change "aperforation" to --a perforation--.

Column 4, line 39, change "exists at a positioned" to --is located at a position--.

Column 5, line 20, change "inteval" to --interval--.

Column 7, line 67, delete "a" at end of line.

Signed and Sealed this

Fourteenth Day of December, 1999

Attest:

Attesting Officer

Q. TODD DICKINSON

Acting Commissioner of Patents and Trademarks